(12) United States Patent
Shi et al.

(10) Patent No.: US 11,863,912 B2
(45) Date of Patent: Jan. 2, 2024

(54) LIGHTING UNIT AND DISPLAY WITH WAVELENGTH-SELECTIVE ILLUMINATION

(71) Applicant: Meta Platforms Technologies, LLC, Menlo Park, CA (US)

(72) Inventors: Zhimin Shi, Bellevue, WA (US); Chloe Astrid Marie Fabien, Seattle, WA (US); Wanli Chi, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 30 days.

(21) Appl. No.: 17/834,731

(22) Filed: Jun. 7, 2022

(65) Prior Publication Data
US 2023/0396744 A1    Dec. 7, 2023

(51) Int. Cl.
*H04N 9/31* (2006.01)
*G02B 27/01* (2006.01)
*G02B 6/124* (2006.01)
*G02B 6/125* (2006.01)
*G02B 6/26* (2006.01)

(52) U.S. Cl.
CPC ........... *H04N 9/3129* (2013.01); *G02B 6/124* (2013.01); *G02B 6/125* (2013.01); *G02B 6/264* (2013.01); *G02B 27/0172* (2013.01)

(58) Field of Classification Search
CPC ........ G02B 6/264; G02B 6/124; G02B 6/125; G02B 27/0172; H04N 9/3129
See application file for complete search history.

(56) References Cited

U.S. PATENT DOCUMENTS

| | | | |
|---|---|---|---|
| 10,527,854 B1 * | 1/2020 | Trail | G02B 27/0081 |
| 2018/0292676 A1 * | 10/2018 | Alexander | G02C 7/086 |
| 2019/0171019 A1 * | 6/2019 | Kim | G02B 6/005 |

* cited by examiner

*Primary Examiner* — Evan P Dzierzynski
*Assistant Examiner* — Nathaniel J Lee
(74) *Attorney, Agent, or Firm* — Pequignot + Myers; Matthew A. Pequignot

(57) ABSTRACT

A display device may include a projector coupled to volume Bragg grating (VBG) based pupil-replicating lightguide. The projector may be a scanning projector or a display panel based projector. A lighting unit for the display panel may have spatially variant spectral composition selected to match angular and wavelength selectivity of the VBGs of the pupil-replicating lightguide, thereby improving light utilization efficiency of the display device. In scanning projector implementations, the center wavelength of the scanned light beam may be varied in coordination with the scanning, to achieve the same effect.

20 Claims, 12 Drawing Sheets

LIGHTING UNIT AND DISPLAY WITH WAVELENGTH-SELECTIVE ILLUMINATION

TECHNICAL FIELD

The present disclosure relates to optical devices, and in particular to visual displays and lighting units therefor.

BACKGROUND

Visual displays provide information to viewers including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended to display images to individual users.

An artificial reality system may include an NED, e.g. a headset or a pair of glasses, configured to present content to a user, and optionally a separate console or a controller. The NED may display virtual objects or combine images of real objects with virtual objects in virtual reality (VR), augmented reality (AR), or mixed reality (MR) applications. For example, in an AR system, a user may view both images of virtual objects, e.g. computer-generated images or CGIs, and the surrounding environment by seeing through a "combiner" component. The combiner of a wearable display is typically transparent to external light but includes some light routing property to direct the display light into the user's field of view.

Because a display of HMD or NED is usually worn on the head of a user, a large, bulky, unbalanced, and/or heavy display apparatus with a heavy battery would be cumbersome and uncomfortable for the user to wear. Head-mounted display devices require compact and efficient illuminators that provide a uniform, even illumination of a display panel or other objects or elements in the display system. Compact planar optical components, such as lightguides, gratings, Fresnel lenses, etc., can be used to reduce size and weight of an optics block. However, some compact planar optics may be prone to low optical throughput, which increases power consumption and associated weight of the powering unit.

BRIEF DESCRIPTION OF THE DRAWINGS

Exemplary embodiments will now be described in conjunction with the drawings, in which.

DETAILED DESCRIPTION

Figure 1:
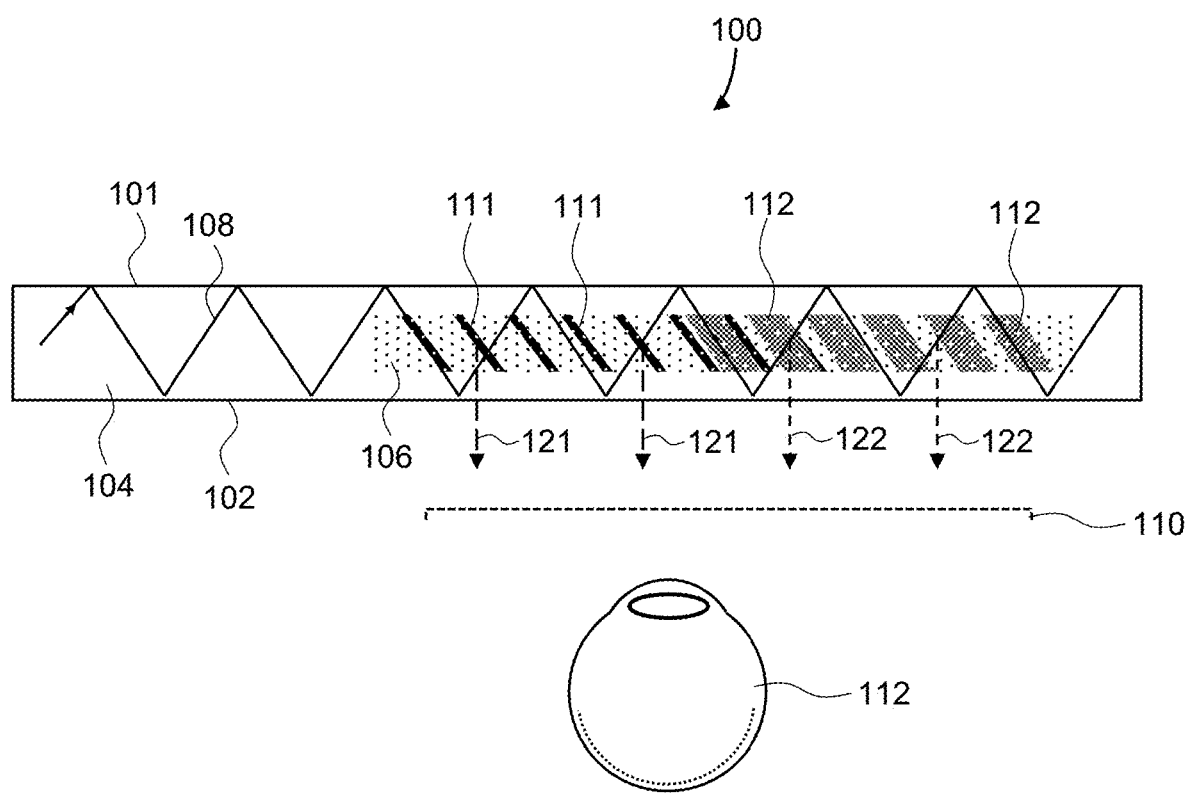
FIG. 1 is a schematic cross-sectional view of a pupil-replicating lightguide with a volume Bragg grating (VBG)-based out-coupler.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of their structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a near-eye display, an image projector may provide image light carrying an angular domain image where ray angles of a ray fan of the image light correspond to pixels of the image being displayed. Since an image viewed by a human eye is in angular domain, the image carried by the image light may be viewed directly, without the need for an ocular lens that converts a ray coordinate of a ray emitted by a microdisplay into a ray angle. For practical purposes, a beam size of the image light, or an exit pupil of the near-eye display, needs to be large enough to allow for a comfortable eye positioning tolerance w.r.t. an optical axis of the image projector.

A pupil-replicating lightguide may be used to expand the exit pupil of the image projector by providing multiple laterally offset portions of the image light beam emitted by the image projector. A pupil-replicating lightguide often has a low optical throughput due to the multitude of inner reflections and comparatively low diffraction efficiency of grating out-couplers used to split and out-couple the image light beam inside the pupil-replicating lightguide. More efficient gratings may be used such as, for example, volume Bragg gratings (VBGs). However, VBGs are naturally wavelength- and direction-selective, and as a result cannot effectively diffract spectrally broadband, wide-FOV light with high overall diffraction efficiency.

In accordance with this disclosure, a lighting unit for a display panel including a VBG-based pupil-replicating lightguide may be configured to provide a multi-wavelength, spatially and/or temporally wavelength-variant illuminating light. The spatial and/or temporal patterns of the illuminating light may be configured to match the spectral efficiency variation of a field of view (FOV) conveyed by a VBG-based pupil-replicating lightguide. Matching the wavelength to local VBG diffraction efficiency peak may considerably, e.g. by an order of magnitude or more, improve the overall light utilization efficiency of the display device, resulting in a considerable increase of overall efficiency and power savings.

In accordance with the present disclosure, there is provided a lighting unit for a display panel. The lighting unit includes a substrate, an array of arcuate waveguides supported by the substrate and running substantially parallel to one another to guide illuminating light in the waveguides, and an array of out-couplers operably coupled to the array of arcuate waveguides and configured for out-coupling portions of the illuminating light from the array of arcuate waveguides, to illuminate the display panel.

In some embodiments, neighboring arcuate waveguides of the array of arcuate waveguides comprise singlemode waveguides configured to guide light of different wavelengths of the illuminating light. The different wavelengths may belong to a same color channel of the illuminating light.

In some embodiments, the lighting unit further includes a bus waveguide for guiding the illuminating light, and an array of spectral bandpass filters coupled to the bus waveguide for out-coupling spectral components of the illuminating light within a spectral bandwidth. Each spectral bandpass filter may be coupled to an arcuate waveguide of the array of arcuate waveguides. The array of spectral bandpass filters may include e.g. a micro-ring resonator, a Mach-Zehnder interferometer, a waveguide grating, a Bragg grating, a diffractive optical element, and/or a holographic optical element. The diffractive optical element or the holographic optical element may be formed on the cladding or in the cladding of the bus waveguide.

The array of out-couplers may include e.g. grating structures formed in the array of arcuate waveguides, scattering features, metamaterial gratings, holographic optical elements, and/or liquid crystal volume gratings. The lighting unit may further include a full reflector supported by the substrate under the array of arcuate waveguides to reflect a portion of the illuminating light out-coupled in a direction of the substrate.

In accordance with the present disclosure, there is provided a display device comprising a display panel for providing image light, and a lighting unit described above. A collimator is coupled to the display panel for collimating the image light for forming an angular domain image. A pupil-replicating lightguide is coupled to the collimator for providing multiple offset portions of the image light to an eyebox of the display device. The lighting unit may further include a light source for providing the illuminating light to the bus waveguide. The light source may include e.g. an optical frequency comb covering the spectral bandwidth, a superluminescent light emitting diode (SLED), and/or a supercontinuum light source.

The pupil-replicating lightguide may include an out-coupler including a plurality of volume Bragg gratings configured to out-couple spectral components of the image light such that different ones of the spectral components correspond to different subsets of arcuate portions of the angular domain image. The arcuate portions of the angular domain image may correspond to arcuate areas of the display panel, and the arcuate waveguides may be disposed to illuminate corresponding ones of the arcuate areas of the display panel.

In embodiments where the lighting unit further includes a bus waveguide coupled to an array of spectral bandpass filters as described above, the display device may further include a controller configured to tune the spectral bandpass filters to increase the portions of the image light out-coupled by the volume Bragg gratings of the out-coupler.

In accordance with the present disclosure, there is further provided a display device comprising a scanning image projector comprising a wavelength-tunable light source for providing a light beam coupled to a scanner for scanning the light beam. A pupil-replicating lightguide is coupled to the scanning image projector for providing multiple offset portions of the scanned light beam to an eyebox of the display device, the pupil-replicating lightguide comprising a plurality of volume Bragg gratings. A controller is operably coupled to the scanning image projector for scanning the light beam in coordination with varying optical power of the light beam to provide an angular domain image. The controller is configured to tune the wavelength-tunable light source in coordination with the scanning such that an instantaneous wavelength of the wavelength-tunable light source corresponds to a portion of the angular domain image being formed by the scanning.

The controller may be configured to tune the wavelength-tunable light source to increase a portion of the light beam out-coupled by a volume Bragg grating of the plurality of volume Bragg gratings. The wavelength-tunable light source may include e.g. an array of lasers with different center wavelengths, a tunable semiconductor laser, a superluminescent light emitting diode (SLED), and/or a nonlinear light source. The wavelength-tunable light source may include the nonlinear light source operating e.g. by second harmonic generation, sum frequency generation, difference frequency generation, four-wave mixing, and/or parametric downconversion.

Referring now to FIG. 1, a pupil-replicating lightguide 100 includes a substrate 104 having opposed outer surfaces 101 and 102, and an out-coupler 106 including a plurality of overlapping volume Bragg gratings (VBGs) including first VBGs 111 and second VBGs 112 that may overlap within the out-coupler 106, as shown. In operation, image light 108 carrying an angular domain image to be displayed to a viewer propagates in the pupil-replicating lightguide 100 in a zigzag optical path by a series of internal reflections from the opposed outer surfaces 101 and 102. The zigzag path of the image light 108 within the substrate 104 of the pupil-replicating lightguide 100 is shown with a single zigzag line. It is to be understood that different portions of the field of view (FOV) of the image light propagate along their own zigzag paths at different angles and zigzag steps; only one is shown in FIG. 1 for clarity. It is further to be understood that a typical out-coupler may include many VBGs, each with its own slant angle and period if needed. Only two such VBGs, 111 and 112, are shown in FIG. 1 for brevity.

On its path, the image light 108 encounters the first 111 and second 112 VBGs of the out-coupler 106. The first 111 and second 112 VBGs out-couple first 121 and second 122 portions of the image light 108 by diffraction. The image light portions 121, 122 propagate towards an eyebox 110, enabling a viewer's eye 112 to see the angular domain image regardless of their eye position for as long as the eye 112 stays within the eyebox 110. Each one of the first 111 and second 112 VBGs diffracts only a portion of the image light propagating within a narrow angular and wavelength range specific for that VBG. Thus, each one of the first 111 and second 112 VBGs only provides a narrow portion of the entire FOV of the image being displayed to the viewer. For broadband image light 108 when e.g. a light-emitting diode (LED) is used to provide light of each color channel, only narrowband portions of each color channel are out-coupled, causing a considerable drop in out-coupling efficiency by the out-coupler 106. The out-coupling efficiency drop causes a sizable drop of an overall optical throughput and efficiency of a visual display using the pupil-replicating lightguide 100.

Figure 2:
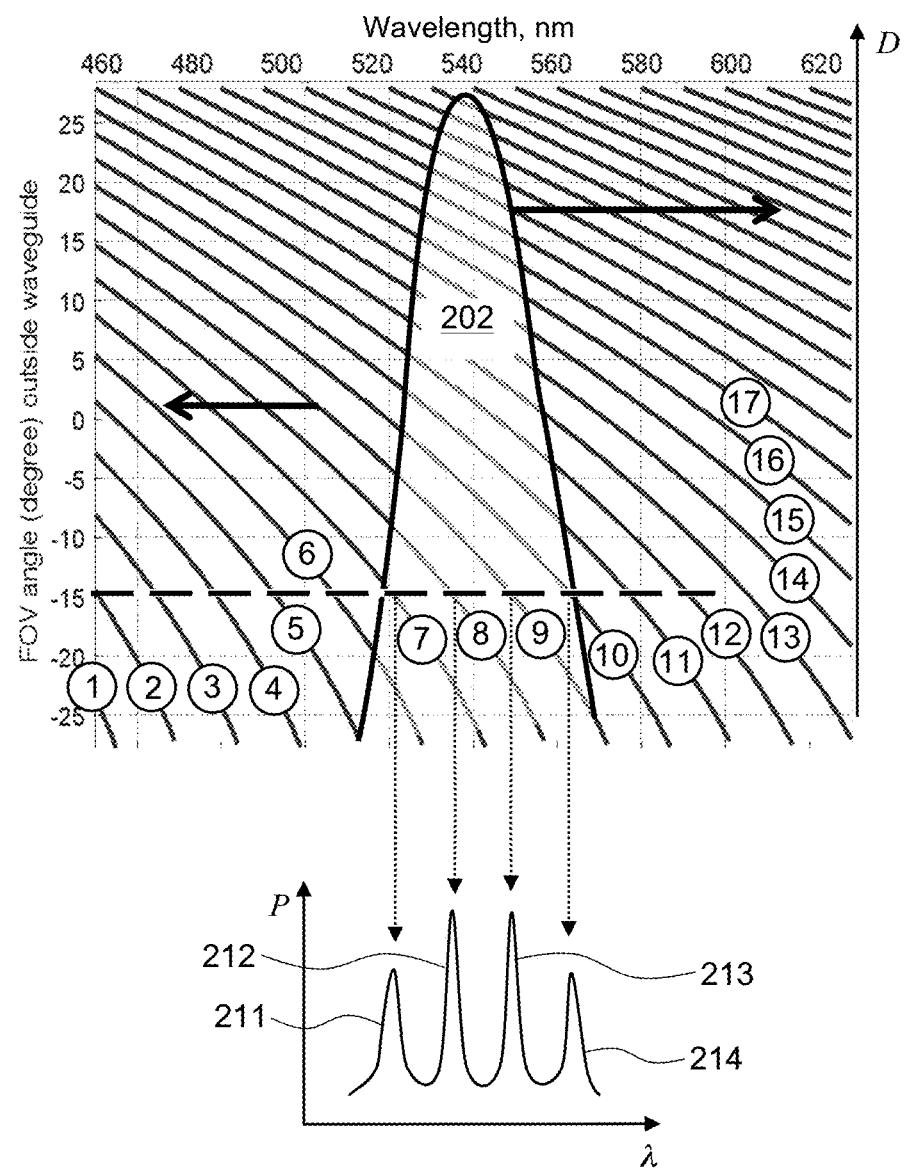
FIG. 2 is a spectral field of view (FOV) plot illustrating wavelength-selective performance of VBGs of the pupil-replicating lightguide of FIG. 1.

The narrowband out-coupling by the VBG-based out-coupler 106 is further illustrated in FIG. 2 where a spectral band 202 of a green channel of the image light (top horizontal axis, wavelength; right vertical axis, diffraction coefficient D) is superimposed with dependencies of out-coupling (diffraction) angles of individual VBGs of the out-coupler 106 (left vertical axis) on wavelength (top horizontal axis). The wavelength dependencies of individual VBGs are denoted in FIG. 2 with encircled numerals 1, 2, . . . , 17 over corresponding dependencies shown with arcuate lines going from top left to bottom right in FIG. 2. Considering the out-coupling efficiency at the FOV/out-coupling angle of −15 degrees for example, the VBG #7 causes a first peak 211 in an output power spectrum 220 at the −15 degrees FOV direction. The VBG #8 causes a second peak 212 in the output power spectrum 220 at the −15 degrees FOV direction. The VBG #9 causes a third peak 213 in the output power spectrum 220 at the −15 degrees FOV direction. The VBG #10 causes a fourth peak 214 in the output power spectrum 220 at the −15 degrees FOV direction. The −15 degrees direction is marked in FIG. 2 with a thick horizontal dashed line. One can see that, for the −15 degrees FOV direction, most spectral band 202 is not out-coupled, and so it will happen for any other FOV direction, causing an overall efficiency loss.

To alleviate the efficiency loss caused by spectral filtering effects illustrated and discussed above with reference to FIG. 2, the spectrum of image light for each FOV angle value may be re-configured such that most of the image light is out-coupled by diffraction on corresponding VBGs of the out-coupler. To that end, the image light spectrum may be made FOV dependent, by taking into account the spectral selectivity curves of individual VBGs 111, 112 of the out-coupler 106 of the pupil-replicating lightguide 100 (FIG. 1).

Figure 3A:
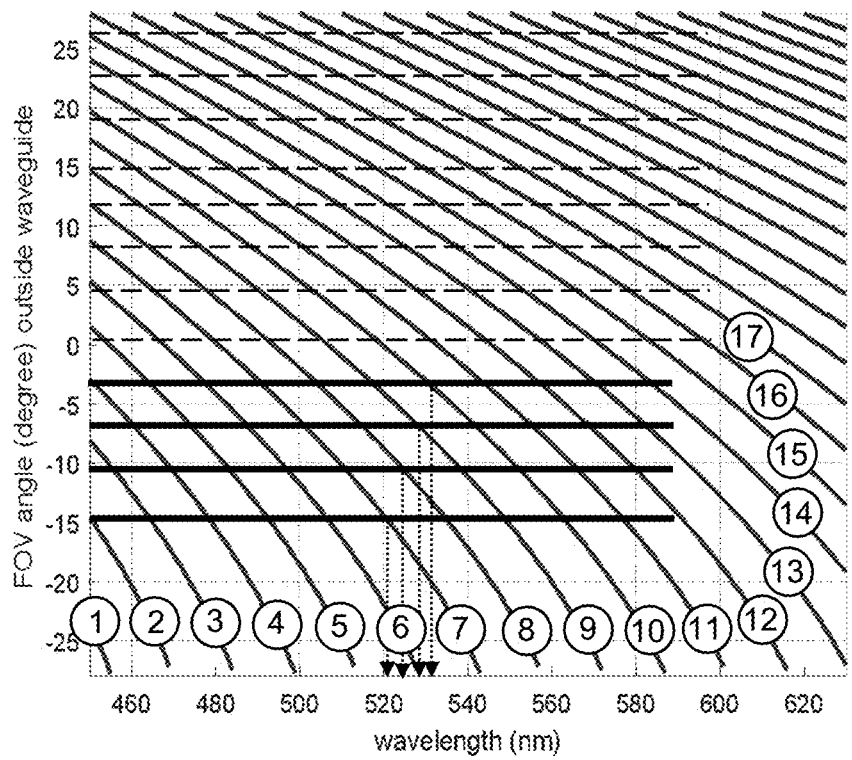
FIG. 3A is a spectral FOV plot illustrating the utilization of a wavelength-selective light source for improving optical throughput of the pupil-replicating lightguide of FIG. 1.
Figure 3B:
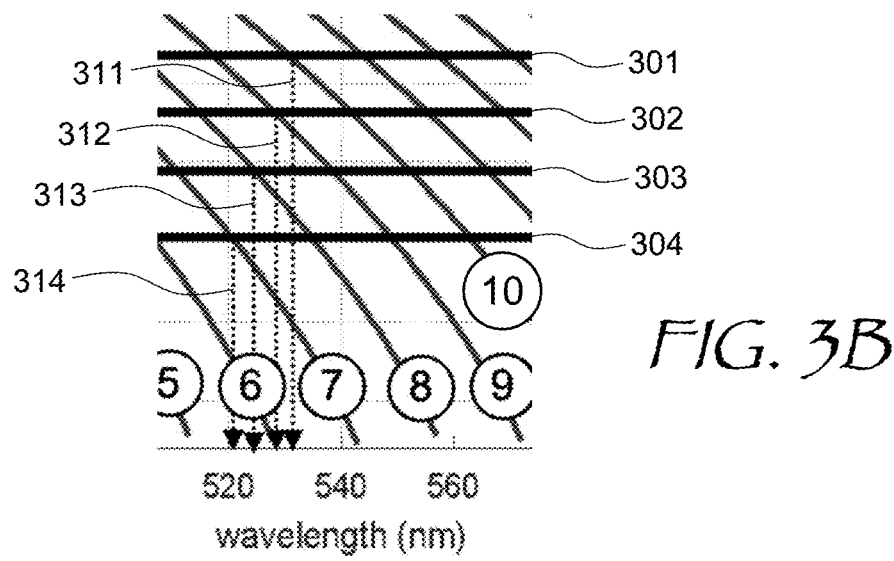
FIG. 3B is a magnified view of FIG. 3A.

Referring for a non-limiting illustrative example to FIGS. 3A and 3B, dependencies of out-coupling angles of individual VBGs denoted with the encircled numerals 1, 2, . . . , 17, as in FIG. 2. For purposes of illustration, FOV angles of −3, −7, −10, and −15 degrees are considered. These FOV angles are denoted with thick horizontal lines 301, 302, 303, and 304 respectively (FIG. 3B). In this example, the image light includes first 311, second 312, third 313, and fourth 314 narrow spectral lines. The first spectral line 311 gets diffracted by the VBG #10 at the FOV of −3 degrees (the top horizontal line 301); the second spectral line 312 gets diffracted by the VBG #9 at the FOV of −7 degrees (second from the top horizontal line 302); the third spectral line 313 gets diffracted by the VBG #8 at the FOV of −10 degrees (third from the top horizontal line 303); and, finally, the fourth spectral line 314 gets diffracted by the VBG #7 at the FOV of −15 degrees (the bottom horizontal line 304). Thus, by providing the image light having a FOV-dependent spectral composition, the overall light utilization efficiency may be substantially increased.

Figure 4:
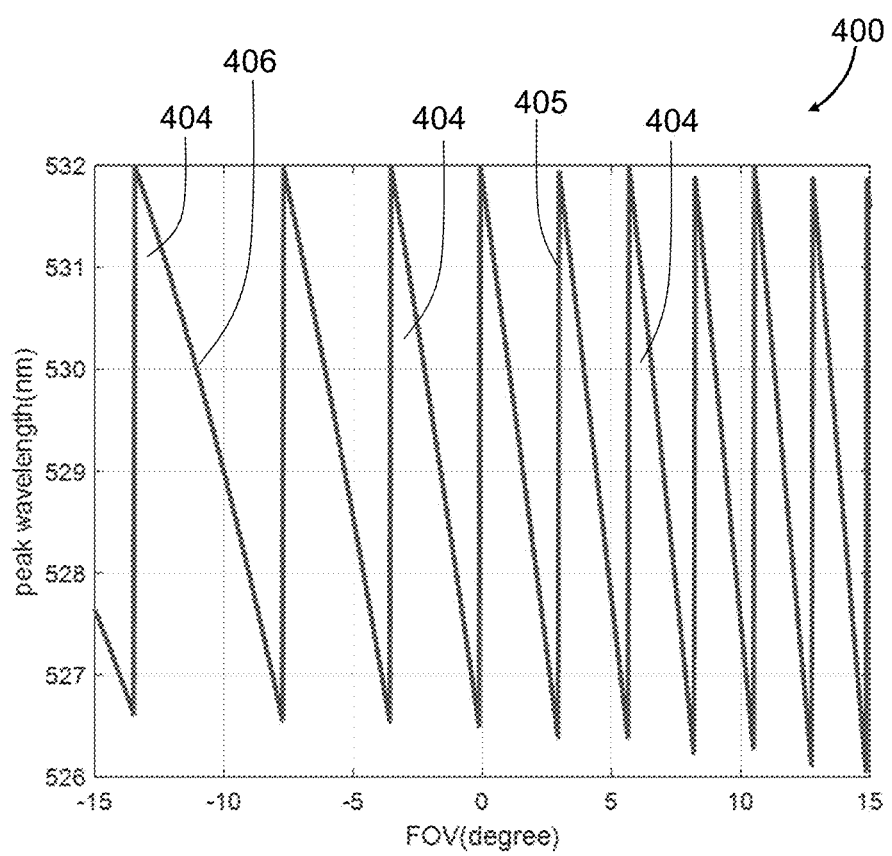
FIG. 4 is a plot of a green color channel peak wavelength vs. one-dimensional (1D) FOV angle of a lighting unit for optimal light utilization by the VBG-based pupil-replicating lightguide of FIG. 1.

FIG. 4 shows one example of such an FOV dependent optical spectrum of image light. An optical spectrum 400 represents a center wavelength of a narrowband spectral peak, e.g. 0.4 nm wide full width at half maximum (FWHM) or less, as a function of FOV angle. Herein, the FOV is one-dimensional for simplicity of illustration. It follows from the previously considered examples of FIGS. 3A and 3B that for optimal FOV dependent out-coupling performance, the FOV angle dependent optical spectrum may be selected to have a sawtooth-like appearance. For example, the green color channel spectrum shown in FIG. 4 may include a sawtooth shape oscillating between 526 nm and 532 nm in this non-limiting example, and having nine sawtooth-shaped oscillations 404. The individual sawtooth shapes include an abrupt wavelength jump 405 on one side (in going from left to right i.e. from negative FOV to positive FOV values), and a slightly arcuate slope 406 on the second side. It is to be understood that the number of the sawtooth shapes depends on the wavelength span of the color channel and other parameters.

Figure 5:
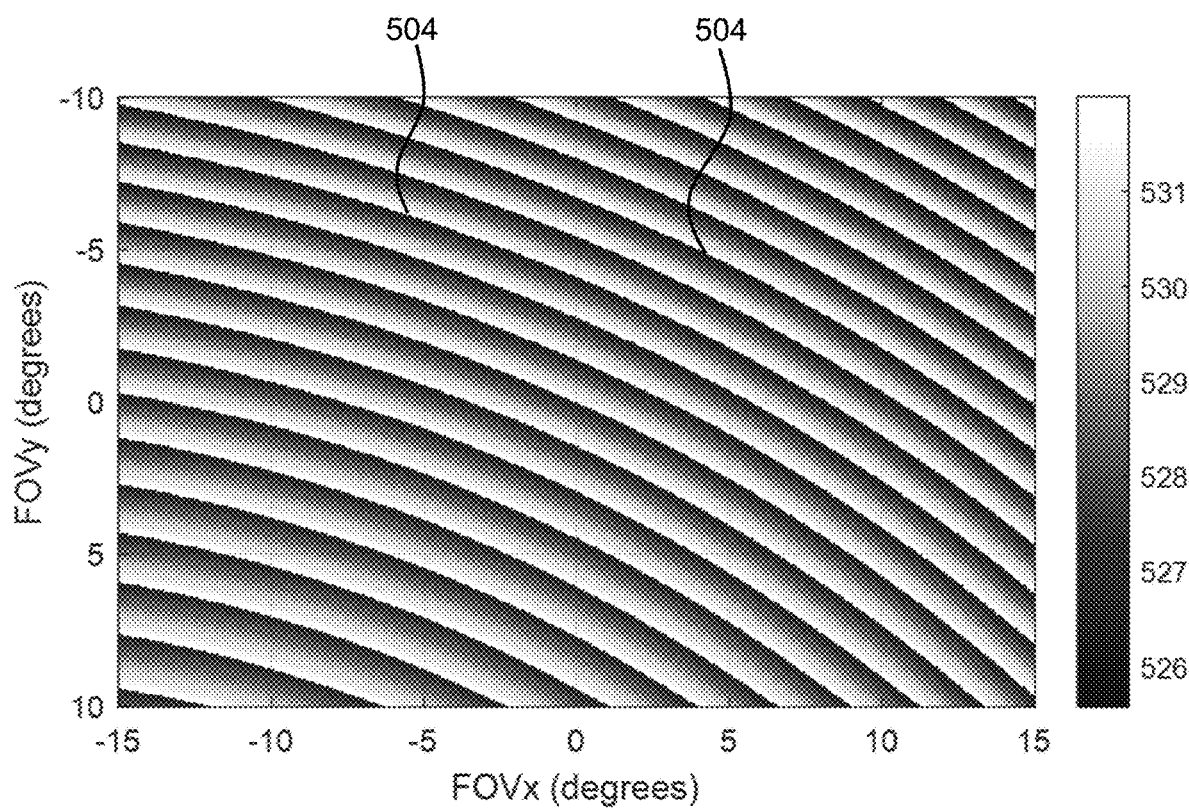
FIG. 5 is a two-dimensional (2D) FOV map of peak wavelength of a lighting unit for optimal light utilization by the VBG-based pupil-replicating lightguide of FIG. 1.

A non-limiting illustrative example of a two-dimensional FOV-dependent optical spectrum of image light is presented in FIG. 5, which is a map of center wavelength of narrowband image light e.g. 0.4 nm FWHM or less. The map covers an example FOV of 30×20 degrees, −15 degrees to 15 degrees horizontal and −10 degrees to 10 degrees vertical. The narrowband image light with FOV-dependent spectral characteristics, or viewing angle-dependent spectral characteristics as illustrated in FIG. 5, includes a plurality of arcuate spectral shapes 504 running nearly parallel to one another. The image light 108 injected into the pupil-replicating lightguide 100 (FIG. 1) will be out-coupled by the out-coupler 106 with a high out-coupling efficiency across the entire FOV. The out-coupling efficiency will be high because for each viewing angle, the peak wavelength of the image light is matched to a local VBG resonant angle and wavelength, resulting in a substantial reduction of unused image light. The full utilization of the image light results in considerable overall display efficiency improvement and power savings of the entire display unit.

The image light with FOV/viewing angle-dependent peak wavelength shown in FIG. 5 may be provided by a display panel—collimator based projector with a specially constructed lighting unit for the display panel. The lighting unit may have spatially varying illumination wavelength repeating the arcuate shapes and distributions of the peak wavelengths depicted in FIG. 5. The projector's collimator disposed downstream of the display panel would then convert this spatial distribution of the peak wavelength of the image light into the angular distribution of the image light carrying an angular domain image.

Figure 6:
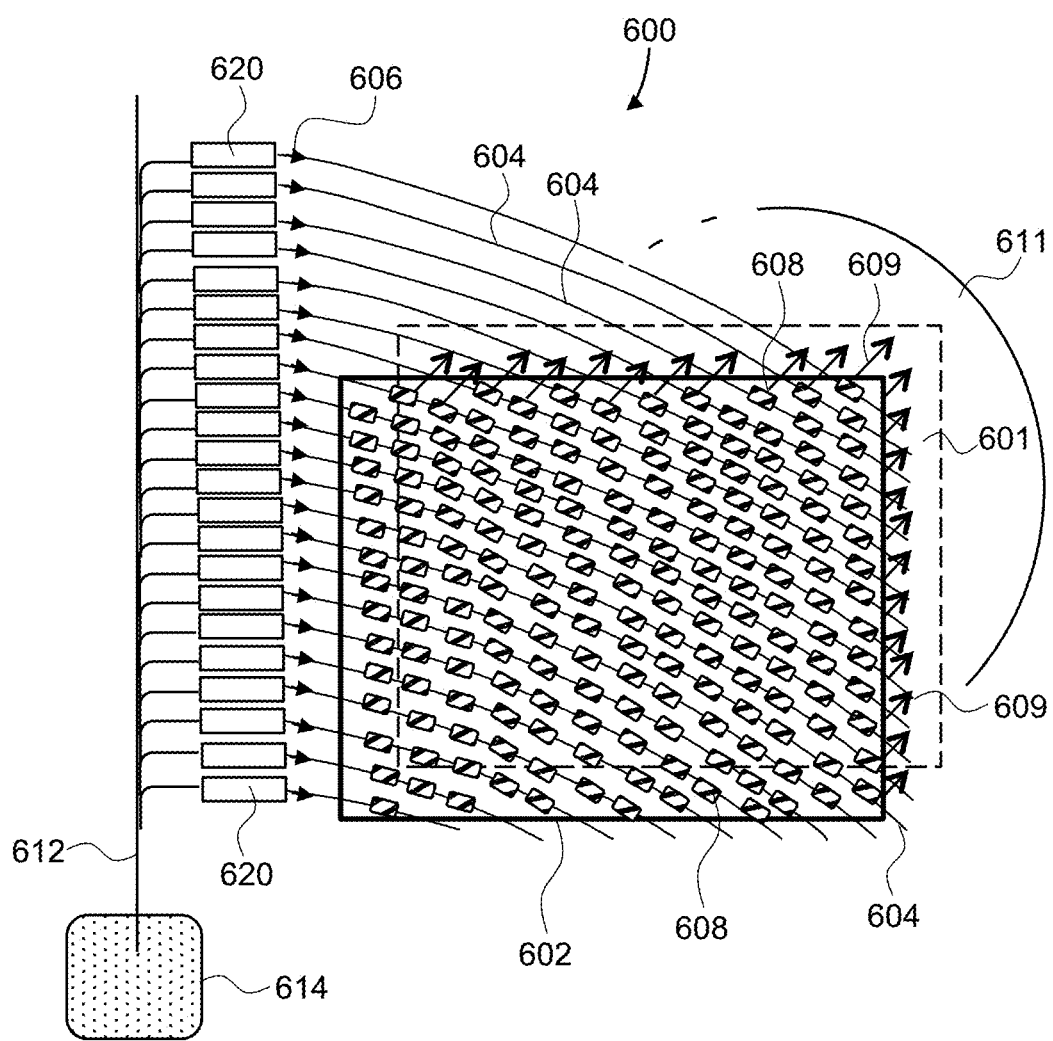
FIG. 6 is a schematic plan view of an implementation of a photonic integrated circuit (PIC) lighting unit, for lighting a display panel of a display device using the VBG-based pupil-replicating lightguide of FIG. 1.

Referring for a non-limiting illustrative example to FIG. 6, a lighting unit 600 for a display panel 601 includes a substrate 602 and an array of arcuate waveguides 604 supported by the substrate 602 and running substantially parallel to one another to guide illuminating light 606 in the array of arcuate waveguides 604. Herein, the term "running substantially parallel" means that, despite the waveguides 604 being arcuate in shape, short portions, e.g. 0.1 mm long portions, of adjacent arcuate waveguides 604, remain parallel to one another, and may eventually bend in a same direction, such that the distance between them stays the same or changes slowly, e.g. changes by less than 10% over 0.1 mm distance.

An array of out-couplers 608 is operably coupled to the array of arcuate waveguides 604. The array of out-couplers 608 is configured for out-coupling portions 609 of the illuminating light 606 from the array of arcuate waveguides 604. The out-coupled portions 609 of the illuminating light 606 provide local illumination of the display panel 601. The shape of the arcuate waveguides 604 corresponds to the shape of the arcuate spectral shapes 504 of the spectral map of FIG. 5, enable a reproduction of the spectral map of FIG. 5 by placing a collimator lens 611 (shown in partial view in FIG. 6 to avoid cluttering of the picture) downstream of the display panel 601. Neighboring arcuate waveguides 604 may include e.g. singlemode waveguides configured to guide light of different wavelengths of the illuminating light 606, to fulfill the VBG diffraction condition discussed above with reference to FIGS. 2, 3A, and 3B. Different wavelengths may belong to a same color channel of the illuminating light 606. The lighting unit 600 may include similar configurations for all color channels of the illuminating light.

In the embodiment shown, the lighting unit 600 further includes a source 614 of the illuminating light 606, such as a laser diode or a laser diode array for example, a bus waveguide 612 coupled to the source 614 for guiding the illuminating light provided by the light source 614, and an array of spectral bandpass filters 620 coupled to the bus waveguide 612 for out-coupling spectral components of the illuminating light 606 within a spectral bandwidth of the illuminating light 606, e.g. within a spectral bandwidth of a single color channel. Each spectral bandpass filter 620 may be coupled to a particular arcuate waveguide 604 of the array of arcuate waveguides 604. The spectral bandpass filters may include any filters suitable for narrowband performance, e.g. 0.5 nm passband or less, and may include micro-ring resonators, directional couplers, Mach-Zehnder interferometers, waveguide gratings, Bragg gratings, diffractive optical elements holographic optical elements, etc. The diffractive optical elements or the holographic optical elements may be formed on or in a cladding of the arcuate waveguides 604. Spectral filters with cyclical transmission spectra, such as ring resonators or Mach-Zehnder interferometers, may be cascaded to increase the free spectral range of the cascade to a value above the spectral width of the image light 606 while preserving the narrow bandpass property of the filter with the smallest free spectral range in the cascade.

Figure 7:
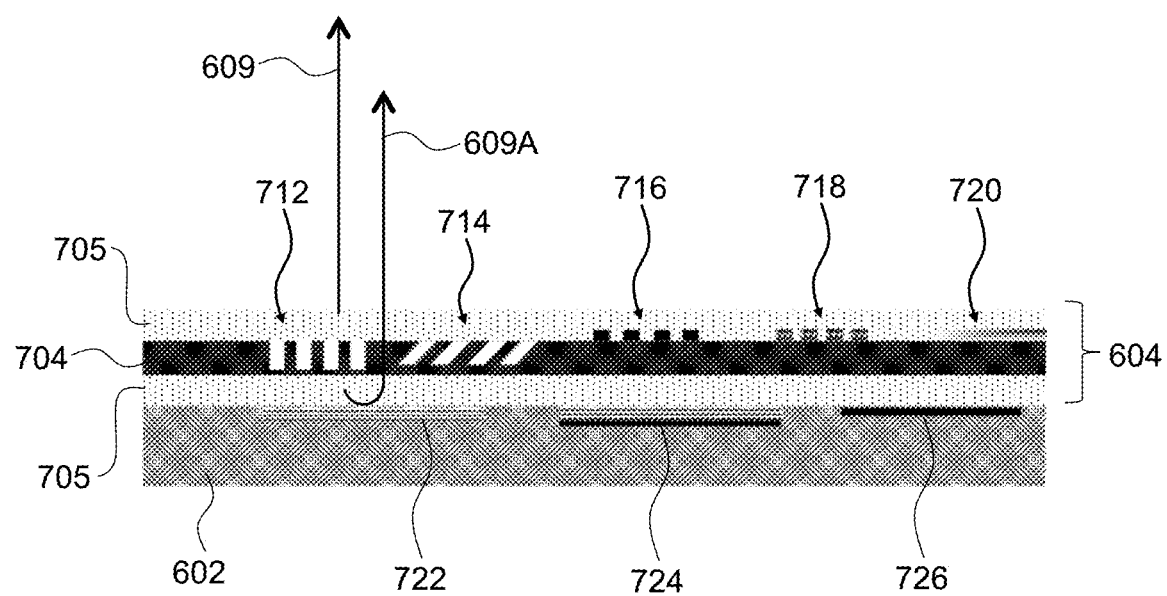
FIG. 7 is a side cross-sectional view of example waveguide out-coupler embodiments of the PIC lighting unit of FIG. 6.

Illustrative embodiments of the out-couplers 608 of the lighting unit 600 are presented in FIG. 7. The out-couplers 608 may include e.g. straight 712 and/or slanted 714 grating structures formed in a core 704 and/or a cladding 705 of the arcuate waveguides 604 of the array of arcuate waveguides, e.g. by etching. The out-couplers 608 may include scattering features 716, metamaterial gratings and/or metamaterial arrays of scatterers 718, and/or holographic optical elements or liquid crystal volume gratings 720. Herein, the term "metamaterial" refers to a spatial arrangement of small (sub-wavelength) geometries of dielectric and semiconductor, dielectric and metal, or dielectric, semiconductor, and metal, configured to provide desired optical properties such as refractive index, optical dispersion, reflection or transmission, etc.

A full reflector may be supported by the substrate 602 under the array of arcuate waveguides 604 to reflect a fraction 609A of the illuminating light portions 609 out-coupled from the arcuate waveguides 604 in the direction of the substrate 602, as illustrated. The full reflector may include a dielectric high reflector (HR) coating 722, a dielectric and metallic HR coating 724, a purely metallic HR coating 726, etc.

Figure 8:
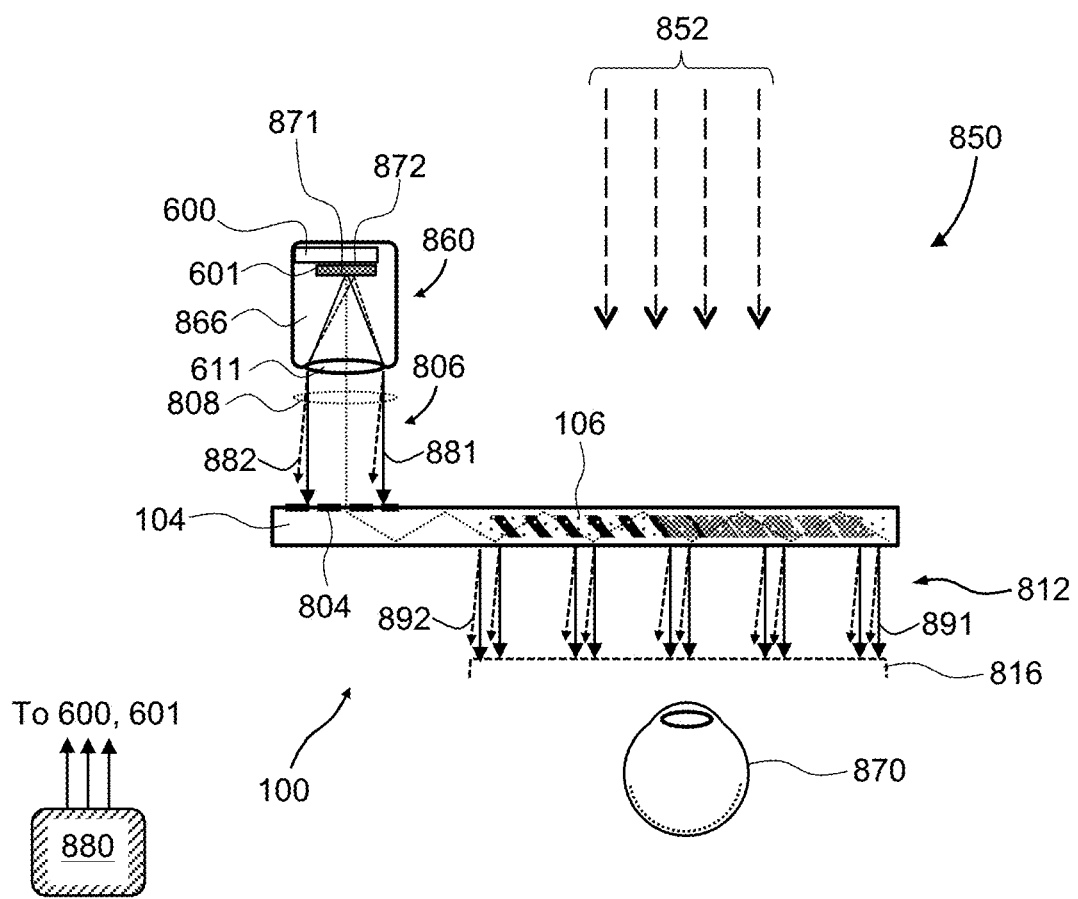
FIG. 8 is a display device with the PIC lighting unit of FIG. 6.

Referring now to FIG. 8, a display device 850 includes a scanning image projector 860 optically coupled to the pupil-replicating lightguide 100 of FIG. 1. The scanning image projector 860 (FIG. 8) includes the display panel 601 of FIG. 6 for providing image light 806, and the lighting unit 600 of FIG. 6 for lighting, e.g. backlighting or front-lighting, the display panel 601. The scanning image projector 860 (FIG. 8) further includes the collimator 611, e.g. a lens, optically coupled to the display panel 601. The display panel 601 and the collimator 611 are supported in a fixed-apart relationship by a body 866 to provide the image light 806, which carries an angular domain image through an exit pupil 808. Herein, the term "angular domain image" means an image where different elements of an image in linear or spatial domain, e.g. pixels of the image displayed by the display panel 601, are represented by angles of corresponding rays of image light, the rays carrying optical power levels and/or color composition corresponding to brightness and/or color values of the image pixels. For example, a first pixel 871 of the display panel 601 disposed at the center of the display panel 601 emits light that is collimated by the collimator 611 into a straight collimated light beam 881 shown with solid lines. A second pixel 872 of the display panel 601 disposed off center of the display panel 601 emits light that is collimated by the collimator 611 into a skewed collimated light beam 882 shown with dashed lines. The collimator 611, therefore, acts as an offset-to-angle converter, converting the linear or spatial domain image displayed by the display panel 601 into an angular domain image carried by the image light 806.

A description of the pupil-replicating lightguide 100 has been provided above with reference to FIG. 1. Briefly, the pupil-replicating lightguide 100 may include the substrate 104, e.g. a slab of a transparent material such as glass, plastic, a transparent oxide, a crystal, etc. An in-coupling grating structure 804 may be supported by the substrate 104 for in-coupling the image light 806 into the substrate 104 for propagation in the substrate 104 by a series of internal reflections, as indicated by the propagation path shown with zigzag dotted lines. The VBG out-coupler 106 replicates the projector's 860 exit pupil 808 by out-coupling the plurality of laterally offset portions 812 of the image light 806 from the substrate 104. Each out-coupled image light portion 812 has a corresponding replicated pupil. The replicated pupils of the out-coupled image light portions 812 combine together to form an exit pupil 816 of the pupil-replicating lightguide 100. The replicated pupils of the out-coupled image light portions 812 may overlap with one another.

The grating parameters of the in-coupling grating 804 and the VBGs 111, 112 of the VBG out-coupler 106 are selected so as to preserve the angular distribution of the image light 806, thereby conveying the angular domain image carried by the image light 806 across the entire exit pupil 816 for observation by a user's eye 870. Continuing the example with the first 871 and second 872 pixels and their emitted straight 881 and skewed 882 collimated image light beams, the straight collimated beam 881 is split into a plurality of straight output collimated sub-beams 891, and the skewed collimated light beam 882 is split into a plurality of skewed output collimated sub-beams 892. The pupil-replicating lightguide 100 may be configured to transmit, i.e. propagate through, external light 852, enabling the user's eye 870 to view the outside environment augmented by the imagery conveyed by the image light portions 812.

The lighting unit 600 provides illuminating light to the display panel 601. Performance of the lighting unit has been described above with reference to FIG. 6. Neighboring arcuate waveguides 604 of the array of arcuate waveguides may be configured to guide different spectral components of the illuminating light 606 within a spectral bandwidth of the source 614. The source 614 may include a superluminescent light emitting diode (SLED), an array of laser diodes, an optical frequency comb covering the spectral bandwidth, a supercontinuum light source, or any broadband light source that provide sufficient wavelength range. The array of spectral bandpass filters 620 coupled to the bus waveguide 612 out-couple spectral components of the illuminating light 606 within the spectral bandwidth, each spectral bandpass filter being coupled to an arcuate waveguide of the array of arcuate waveguides.

The lateral distribution of the spectral composition (i.e. the peak wavelength) of the illuminating light 606, defined by the shape of the arcuate waveguides 604 and wavelengths of the individual spectral components of the illuminating light 606 propagating in specific arcuate waveguides 604, is such that the image light 806 (FIG. 8) has the wavelength distribution over the FOV (after the offset-to-angle conversion by the collimator 611) matching that of efficient diffraction by the VBGs of the VBG out-coupler 106, in accordance with FIG. 5. The VBGs out-couple spectral components of the image light such that different ones of the spectral components correspond to different subsets of arcuate portions of the angular domain image. This is achieved by having the arcuate portions of the angular domain image correspond to arcuate areas of the display panel 601, and by having the arcuate waveguides 604 disposed so as to illuminate corresponding ones of the arcuate areas of the display panel 601. Such a configuration ensures that most of the image light 806 is effectively diffracted out by the VBGs of the VBG out-coupler 106 due to matching the angular and wavelength selectivity of the VBGs, as has been explained above with reference to FIGS. 2, 3A, and 3B. In some embodiments, the display device 850 may further include a controller 880 operably coupled to the lighting unit 600 and the display panel 601 and configured to tune the spectral bandpass filters 620 (FIG. 6) to increase the portions of the image light 812 (FIG. 8) out-coupled by the volume Bragg gratings of the out-coupler 106.

Figure 9:
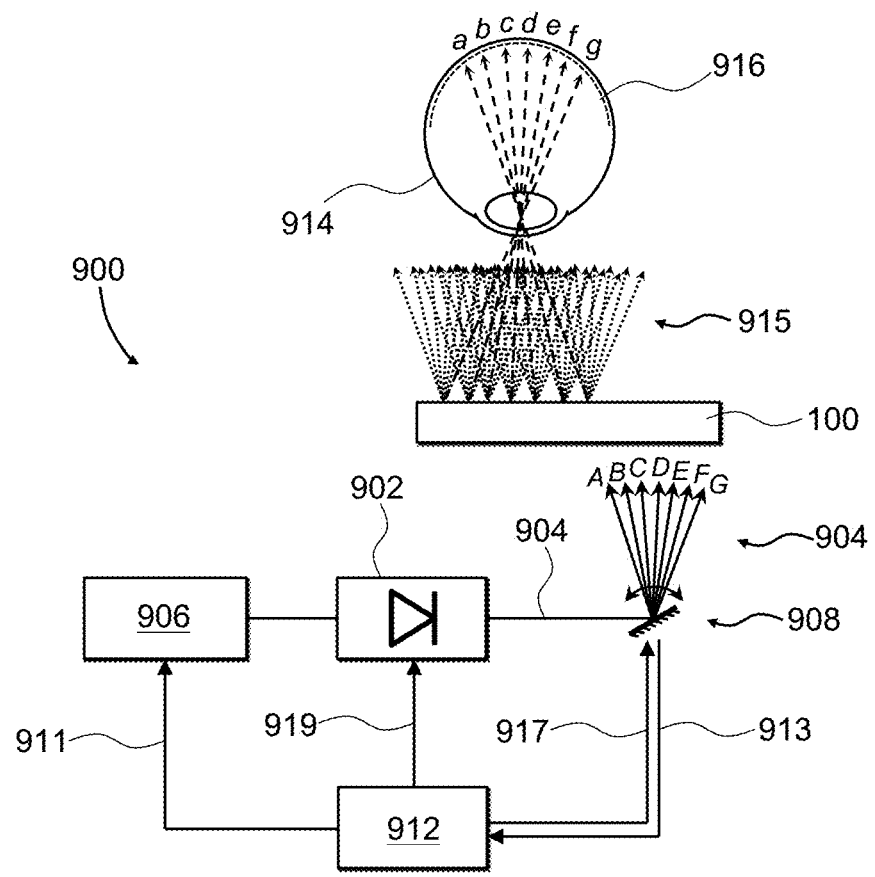
FIG. 9 is a schematic view of a near-eye scanning projector display using the pupil-replicating lightguide of FIG. 1.

The concepts of the present disclosure are applicable not only to microdisplay-based image projectors but also to scanning projector configurations. Referring to FIG. 9, a scanning display device 900 includes a wavelength-tunable light source 902 for providing a light beam 904. An electronic driver 906 may be operably coupled to the wavelength-tunable light source 902 for powering the wavelength-tunable light source 902. A beam scanner 908 including a tiltable reflector, e.g. a microelectromechanical (MEMS) tiltable reflector, is optically coupled to the wavelength-tunable light source 902 for scanning the light beam 904 generated by the wavelength-tunable light source 902. The scanning may be performed in one or two dimensions, e.g. about an X-axis and/or Y-axis perpendicular to the X-axis, where X- and Y-axes are in plane of the MEMS reflector at its normal i.e. unpowered position. The pupil-replicating lightguide 100 provides a light field 915 including multiple laterally shifted parallel portions of the scanned light beam 904, which repeat the beam angle, i.e. a direction of propagation of the light beam 904 at every moment of time as the light beam 904 is scanned about one or two axes, as the case may be.

A controller 912 is operably coupled to the beam scanner 908 and the electronic driver 906. The controller 912 is configured for operating the electronic driver 906 for powering the wavelength-tunable light source 902 in coordination with driving the beam scanner 908 and, optionally, reading its position. For example, the controller 912 may apply a control signal 913 to cause the beam scanner 908 to scan the light beam 904 through a succession of beam angles or directions "A" through "G", while applying a power signal 911 to cause the electronic driver 906 to change the brightness of the wavelength-tunable light source 902 in accordance with an image to be displayed, eventually forming an angular domain image for direct observation by a viewer's eye 914. A feedback circuit may provide a feedback signal 917 to indicate the current MEMS mirror position to the controller 912. The controller 912 may also apply a wavelength control signal 919 to change a wavelength of the wavelength-tunable light source 902 for out-coupling efficiency control as will be explained below.

The pupil-replicating lightguide 100 provides multiple laterally displaced parallel portions of the scanned light beam 904 in directions "A" through "G", as illustrated. The viewer's eye 914 receives the light field 915, and forms an image at an eye's retina 916 from the corresponding replicated light beams, as shown. A linear position of the beam portions on the eye's retina 916 is denoted with letters "a" through "g", and corresponds to the beam angles or directions "A" through "G" of the scanned light beam 904. In this manner, the eye 914 forms a linear domain image on the eye's retina 916 from the angular domain image formed by the light field 915.

Figure 10:
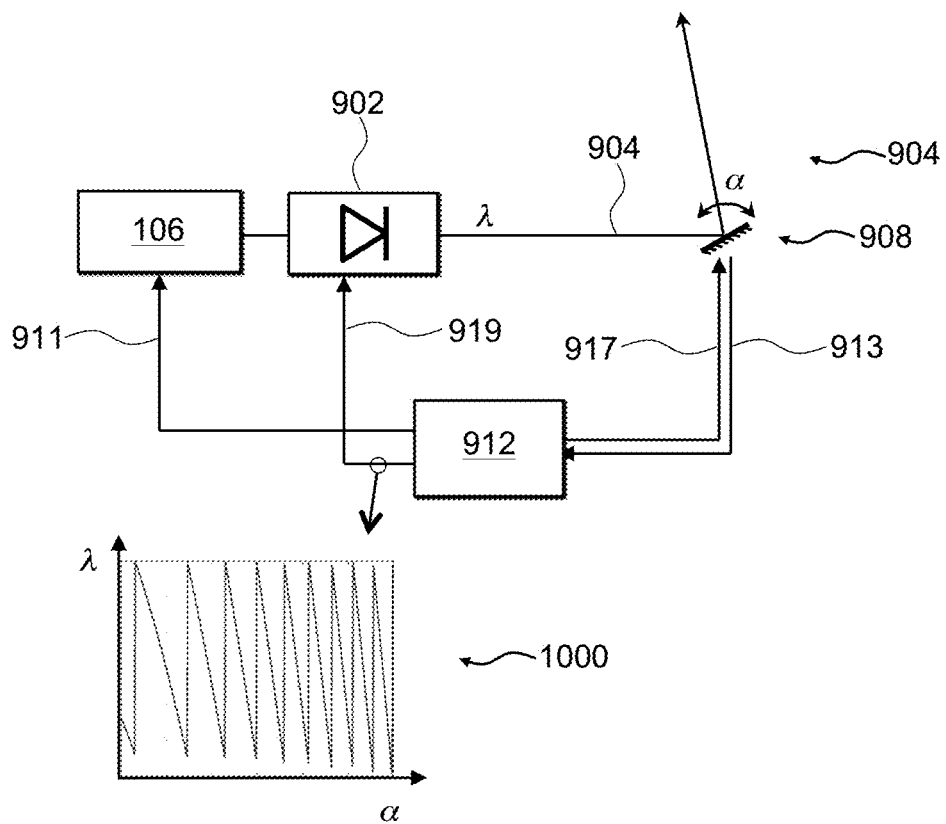
FIG. 10 is a schematic view of a control circuit for tuning the wavelength of the light source of the scanning projector display of FIG. 9 in sync with the scanning, to improve optical throughput.

The controller 912 may be configured to tune the wavelength-tunable light source in coordination with the scanning by the beam scanner 908 such that an instantaneous wavelength of the wavelength-tunable light source 902 corresponds to a portion of the angular domain image being formed by the scanning, i.e. to the instantaneous angle of the light beam 904, within a pre-defined center wavelength-beam angle relationship, to improve the out-coupling efficiency by the VBG out-coupler 106 of the VBG-based pupil-replicating lightguide 100 of FIG. 1. Referring for a non-limiting illustrative example to FIG. 10, the controller 912 may be configured to tune the center wavelength 2 of the wavelength-tunable light source 902 in accordance with a sawtooth-shaped function 1000 defining a relationship between the center wavelength 2 and an instantaneous beam direction a scanned by the beam scanner 908. The function 1000 may be selected so as to increase a portion of the light beam 904 out-coupled by VBG(s) of the VBG out-coupler 106, the VBG(s) corresponding to the current beam angle α within the scanned FOV of the scanning display device 900. To that end, the function 1000 may approximate the optical spectrum 400 of FIG. 4, for example. For 2D scanning, the direction can be described by two angles, a and ft.

The wavelength-tunable light source 902 may include e.g. a wavelength-combined array of lasers at different center wavelengths operated one by one as the scanning progresses. The wavelength-tunable light source 902 may also include a tunable semiconductor laser, or a nonlinear light source operating by some nonlinear optical effect. For example and without limitation, the nonlinear optical effect may include second harmonic generation, sum frequency generation, difference frequency generation, four-wave mixing, or parametric downconversion. The nonlinear light source may benefit from the availability of tunable laser sources in near-infrared region, providing a desired wavelength tunability in the visible wavelength region.

Figure 11:
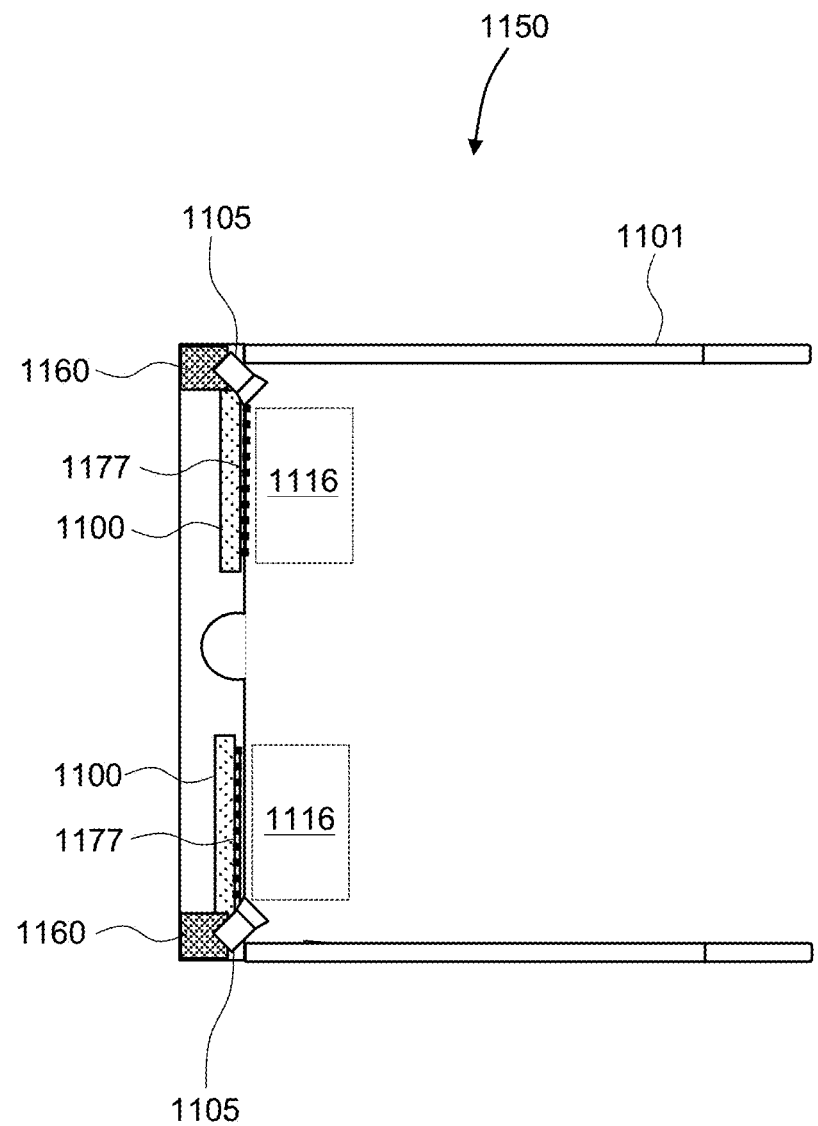
FIG. 11 is a view of an augmented reality (AR) display of this disclosure having a form factor of a pair of eyeglasses.

Referring to FIG. 11, an augmented reality (AR) near-eye display 1150 includes a frame 1101 having a form factor of a pair of eyeglasses. The frame 1101 supports, for each eye: a projector 1160 e.g. a scanning or a microdisplay-based projector described above, a pupil-replicating waveguide 1100 such as the pupil-replicating waveguide 100 of FIG. 1 optically coupled to the projector 1160, an eye-tracking camera 1105, a and a plurality of illuminators 1177. The illuminators 1177 may be supported by the pupil-replicating waveguide 1100 for illuminating an eyebox 1116 defined herein as an area where an image of acceptable quality may be observed by a user's eye, not shown.

The projector 1160 provides a fan of light beams carrying an image in angular domain to be viewed by a user's eye placed in the eyebox 1116. The pupil-replicating waveguide 1100 receives the fan of light beams and provides multiple laterally offset parallel copies of each beam of the fan of light beams, thereby extending the projected image over the entire eyebox 1116, as explained above with reference to FIG. 9. For augmented reality (AR) applications, the pupil-replicating waveguide 1100 may be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1105 is to determine position and/or orientation of both eyes of the user. Once the position and orientation of the user's eyes are known, a gaze convergence distance and direction may be determined. The imagery displayed by the projectors 1160 may be dynamically adjusted to account for the user's gaze for a better fidelity of immersion of the user into the displayed augmented reality scenery, and/or to provide specific functions of interaction with the augmented reality that may or may not be found in the real world.

In operation, the illuminators 1177 illuminate the eyes at the corresponding eyeboxes 1116, to enable the eye-tracking cameras 1105 to obtain the images of the eyes, as well as to provide reference reflections i.e. glints. The glints may function as reference points in the captured eye images, facilitating the eye gazing direction determination by determining position of the eye pupil images relative to the glints images. To avoid distracting the user with illuminating light, the latter may be made invisible to the user. For example, infrared light may be used to illuminate the eyeboxes 1116.

Images obtained by the eye-tracking cameras 1105 may be processed in real time to determine the eye gazing directions of both eyes of the user. In some embodiments, the image processing and eye position/orientation determination functions may be performed by a central controller, not shown, of the AR near-eye display 1150. The central controller may also provide control signals to the projectors 1160 to generate the images to be displayed to the user, depending on the determined eye positions, eye orientations, gaze directions, eyes vergence, etc.

Figure 12:
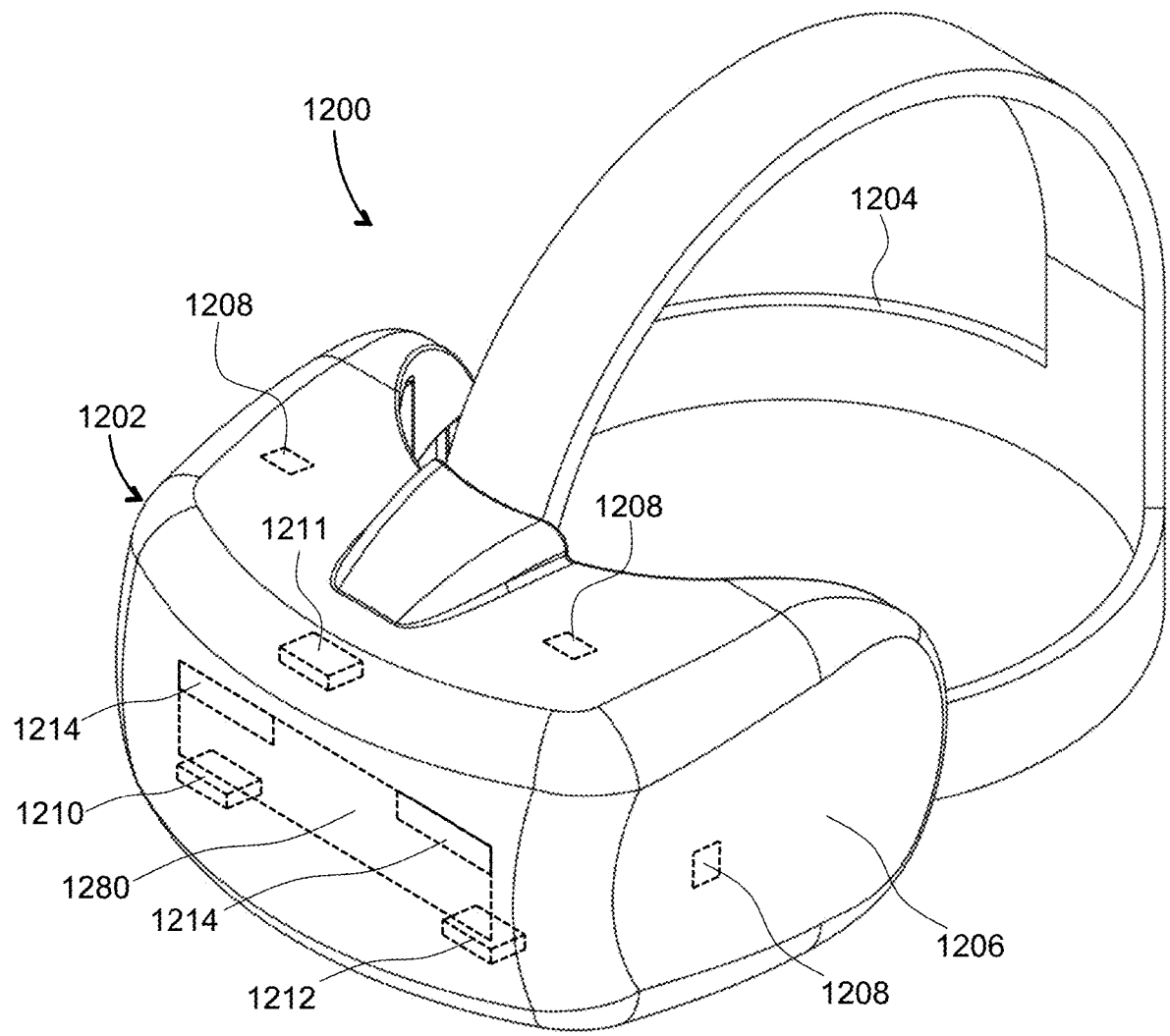
FIG. 12 is a three-dimensional view of a head-mounted display (HMD) of this disclosure.

Turning to FIG. 12, an HMD 1200 is an example of an AR/VR wearable display system which encloses the user's face, for a greater degree of immersion into the AR/VR environment. The HMD 1200 may generate the entirely virtual 3D imagery. The HMD 1200 may include a front body 1202 and a band 1204 that can be secured around the user's head. The front body 1202 is configured for placement in front of eyes of a user in a reliable and comfortable manner. A display system 1280 may be disposed in the front body 1202 for presenting AR/VR imagery to the user. The display system 1280 may include any of the projectors, displays, and/or pupil-replicating lightguides disclosed herein. Sides 1206 of the front body 1202 may be opaque or transparent.

In some embodiments, the front body 1202 includes locators 1208 and an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or some combination thereof.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. The determined gaze direction and vergence angle may be used to adjust the display system 1280 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A lighting unit for a display panel, the lighting unit comprising:
a substrate;
an array of arcuate waveguides supported by the substrate and running substantially parallel to one another to guide illuminating light therein; and
an array of out-couplers operably coupled to the array of arcuate waveguides and configured for out-coupling portions of the illuminating light from the array of arcuate waveguides, to illuminate the display panel.

2. The lighting unit of claim 1, wherein neighboring arcuate waveguides of the array of arcuate waveguides comprise singlemode waveguides configured to guide therein light of different wavelengths of the illuminating light.

3. The lighting unit of claim 2, wherein the different wavelengths belong to a same color channel of the illuminating light.

4. The lighting unit of claim 1, further comprising:
a bus waveguide for guiding the illuminating light; and
an array of spectral bandpass filters coupled to the bus waveguide for out-coupling spectral components of the illuminating light within a spectral bandwidth, wherein each spectral bandpass filter is coupled to an arcuate waveguide of the array of arcuate waveguides.

5. The lighting unit of claim 4, wherein the array of spectral bandpass filters comprises at least one of: a micro-ring resonator; a Mach-Zehnder interferometer; a waveguide grating; a Bragg grating; a diffractive optical element; or a holographic optical element.

6. The lighting unit of claim 5, wherein:
the bus waveguide comprises a cladding; and
the diffractive optical element or the holographic optical element is formed on the cladding or in the cladding.

7. The lighting unit of claim 1, wherein the array of out-couplers comprises at least one of: grating structures formed in the array of arcuate waveguides; scattering features; metamaterial gratings; holographic optical elements; or liquid crystal volume gratings.

8. The lighting unit of claim 1, further comprising a full reflector supported by the substrate under the array of arcuate waveguides to reflect a portion of the illuminating light out-coupled in a direction of the substrate.

9. A display device comprising:
a display panel for providing image light, and a lighting unit for the display panel;
a collimator coupled to the display panel for collimating the image light for forming an angular domain image; and
a pupil-replicating lightguide coupled to the collimator for providing multiple offset portions of the image light to an eyebox of the display device;
wherein the lighting unit comprises:
a substrate;
an array of arcuate waveguides supported by the substrate and running substantially parallel to one another to guide illuminating light therein; and
an array of out-couplers operably coupled to the array of arcuate waveguides and configured for out-coupling portions of the illuminating light from the array of arcuate waveguides to illuminate the display panel for producing the image light.

10. The display device of claim 9, wherein neighboring arcuate waveguides of the array of arcuate waveguides are configured to guide therein different spectral components of the illuminating light within a spectral bandwidth.

11. The display device of claim 10, wherein the lighting unit further comprises:
a bus waveguide for guiding the illuminating light; and
an array of spectral bandpass filters coupled to the bus waveguide for out-coupling spectral components of the illuminating light within the spectral bandwidth, wherein each spectral bandpass filter is coupled to an arcuate waveguide of the array of arcuate waveguides.

12. The display device of claim 11, wherein the array of spectral bandpass filters comprises at least one of: a micro-ring resonator; a directional coupler; a Mach-Zehnder interferometer; a waveguide grating; a Bragg grating; a diffractive optical element; or a holographic optical element.

13. The display device of claim 11, wherein the lighting unit further comprises a light source for providing the illuminating light to the bus waveguide, the light source comprising at least one of: an optical frequency comb covering the spectral bandwidth; a superluminescent light emitting diode (SLED); or a supercontinuum light source.

14. The display device of claim 10, wherein the pupil-replicating lightguide comprises an out-coupler including a plurality of volume Bragg gratings configured to out-couple spectral components of the image light such that different ones of the spectral components correspond to different subsets of arcuate portions of the angular domain image.

15. The display device of claim 14, wherein the arcuate portions of the angular domain image correspond to arcuate areas of the display panel, and wherein the arcuate waveguides are disposed to illuminate corresponding ones of the arcuate areas of the display panel.

16. The display device of claim 14, wherein the lighting unit further comprises:
a bus waveguide for guiding the illuminating light; and
an array of spectral bandpass filters coupled to the bus waveguide for out-coupling spectral components of the illuminating light within the spectral bandwidth, wherein each spectral bandpass filter is coupled to an arcuate waveguide of the array of arcuate waveguides;
the display device further comprising a controller configured to tune the spectral bandpass filters to increase the portions of the image light out-coupled by the volume Bragg gratings of the out-coupler.

17. A display device comprising:
a scanning image projector comprising a wavelength-tunable light source for providing a light beam coupled to a scanner for scanning the light beam; and
a pupil-replicating lightguide coupled to the scanning image projector for providing multiple offset portions of the scanned light beam to an eyebox of the display device, the pupil-replicating lightguide comprising a plurality of volume Bragg gratings; and
a controller operably coupled to the scanning image projector for scanning the light beam in coordination with varying optical power of the light beam to provide an angular domain image;
wherein the controller is configured to tune the wavelength-tunable light source in coordination with the scanning such that an instantaneous wavelength of the wavelength-tunable light source corresponds to a portion of the angular domain image being formed by the scanning.

18. The display device of claim 17, wherein the controller is configured to tune the wavelength-tunable light source to increase a portion of the light beam out-coupled by a volume Bragg grating of the plurality of volume Bragg gratings.

19. The display device of claim 17, wherein the wavelength-tunable light source comprises at least one of: an array of lasers with different center wavelengths; a tunable semiconductor laser; a superluminescent light emitting diode (SLED); or a nonlinear light source.

20. The display device of claim 19, wherein the wavelength-tunable light source comprises the nonlinear light source operating by at least one of: second harmonic generation, sum frequency generation, difference frequency generation, four-wave mixing, or parametric downconversion.

* * * * *